United States Patent Office
3,195,990
Patented July 20, 1965

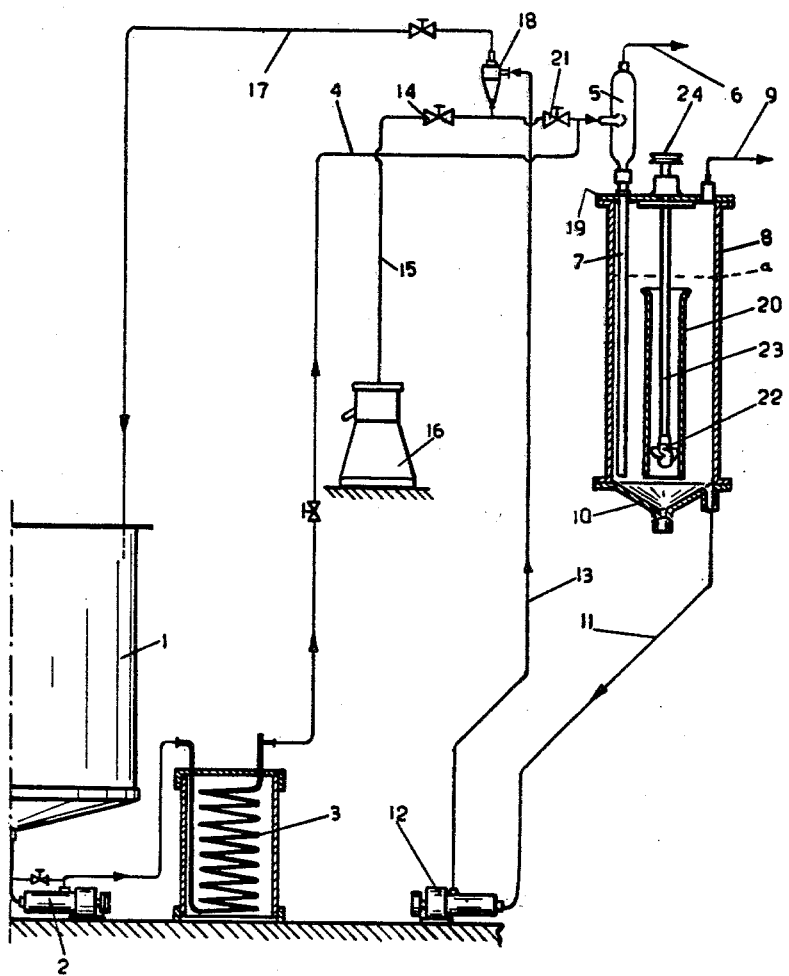

3,195,990
CRYSTALLIZING UNDER VACUUM
Johan F. Witte, Amsterdam, Netherlands, assignor to Werkspoor N.V., Amsterdam, Netherlands, a company of the Netherlands
Filed Apr. 9, 1962, Ser. No. 186,070
Claims priority, application Netherlands, Apr. 14, 1961, 263,605
2 Claims. (Cl. 23—301)

The invention relates to a crystallizing device provided with means for maintaining a reduced pressure in the device and with a classifier into which at least part of the crystal slurry withdrawn from the crystalizer vessel is introduced and said classifier having its outlet for the coarser crystals connected to the crystallizer vessel.

In a crystallizing device of this kind the solution to be crystallized is mixed with the coarser crystals discharged from the classifier and also containing mother liquor. The evaporation due to the expansion of the solution and the crystallization process usually take place in the same vessel and a pumping element or like circulating means being provided for thoroughly mixing the whole mass contained in the vessel, so that the crystallization is rapidly completed.

With solutions of substances, such as urea, in which a relatively large quantity of gases is dissolved or chemically bound and the gases are freed by the expansion in the crystallizing vessel, the gas bubbles generated in the lower part of the vessel will ascend towards the liquid level in the vessel and during said movement will adhere to crystals which therefore will also rise and accumulate at the liquid level in the form of a thick foamy layer. Said foamy layer prevents a regular evaporation and the circulation of the mass in the vessel, whereby differences in the degree of supersaturation occur and false grain is generated.

The invention has for its object to prevent the formation of foam in the crystallizer vessel and to this end according to the invention the outlet of the classifier for discharging mother liquor together with coarse crystals is connected to the crystallizer vessel through the intermediary of an expansion vessel to which also the solution to be crystallized is supplied.

In said expansion vessel a preliminary expansion takes place, but as the solution in said vessel is cooled by self expansion down to a temperature exceeding the temperature in the crystallizer vessel, the gases contained in the solution are freed but no crystallization will occur. It mainly depends on the ratio between the quantity of crystal slurry discharged at the lower outlet of the classifier and the quantity of solution to be crystallized introduced into the expansion vessel to which temperature the liquid in said vessel may be expanded. In many cases said temperature will exceed the temperature in the crystallizer vessel by a few degrees Celsius.

The invention will be further described with reference to the accompanying drawing showing a diagrammatical illustration of a crystallizing device according to the invention having a classifier in the form of a cyclone.

The solution to be crystallized is contained in the vessel 1 and by a pump 2 is forced through a heat exchanger 3 in which the solution is heated to the desired temperature.

The solution heated in the heat exchanger 3 through conduit 4 flows into the vessel 5, which is a pre-evaporator in which the solution is subjected to a reduced pressure so that evaporation takes place and the solution is cooled down by self expansion to a temperature not low enough to produce crystallization. The pre-evaporator 5 is connected by a conduit 6 which by conduit 6 is connected to a condenser not shown in the drawing so that gases and vapour may escape from the solution and said latter is cooled.

The discharge pipe 7 of vessel 5 extends downwards into the crystallizer vessel 8 in which evaporation also takes place. Said vessel by means of conduit 9 is connected to a second condenser not shown so that also in said vessel an evaporation of the solution takes place so that the solution is further cooled for obtaining the degree of supersaturation required for crystallizing the solution. The vessel 8 is provided with a conical body 10 to which the suction conduit 11 of a pump 12 is connected, said pump withdrawing the crystals produced and mixed with mother liquor from the crystallizer vessel and forcing them through a conduit 13 into a cyclone 18. Said cyclone at its outlet for the coarse fraction is connected to the expansion vessel 5 so that said fraction is mixed with the solution supplied by conduit 4. A portion of the coarse fraction through a conduit 15 provided with a valve 14 is passed to a centrifuge 16. Also the conduit connecting the lower outlet of the cyclone 18 to the expansion vessel 5 is provided with a valve 21.

The finer fraction leaving the cyclone 18 is returned to vessel 1 by means of conduit 17 and in said vessel the crystals are dissolved again.

A vertical tube 20 is centrally mounted in the crystallizer vessel and open at its lower end. In the central tube 20 an impeller 22 is provided and secured on a shaft 23 extending outwards through the cover 19 and carrying a driving disc 24 at its outer end.

The crystallizer vessel 8 remains filled with the solution for two thirds of its volume and the upper part of the vessel above the liquid level serves as a vapour separator. The quantity of crystal slurry returned to vessel 8 by the cyclone 18 is adjusted to the quantity of solution supplied by conduit 4 from the receptacle 1 to the expansion vessel 5 in such a manner that the level $a$ in the crystallizer vessel 8 does not vary.

As the tube 7 extends downwards into the vessel 8 near the bottom 10 the mixture from the expansion vessel 5 is introduced into the lower end of the vessel 8 and it appeared that with said arrangement the most favourable results are obtained.

By way of example it may be stated that when crystallizing an urea solution having a concentration of 66.2% the solution was heated in the heat exchanger 3 to a temperature of 65° C. During the expansion of the solution in the expansion vessel 5 the temperature was decreased to 52° C. and in the crystallizer vessel 8 the temperature still further decreased to 50° C. The crystal slurry discharged from the cyclone could be treated in a centrifuge without difficulty.

What I claim is:

1. A process for crystallizing solutions developing gases when subjected to a vacuum, said process comprising the steps of continuously feeding a solution through a pre-evaporator to a crystallizer in both of which a vacuum is maintained, continuously withdrawing the crystal slurry formed in the crystallizer, passing a portion of the crystal slurry to a classifier to separate said slurry into fine and coarse fractions, supplying a portion of the coarse fraction to the pre-evaporator, and mixing the coarse fraction with the solution to be crystallized in the pre-evaporator while maintaining the absolute pressure in the pre-evaporator greater than that in the crystallizer to an extent that no crystallization of the solution takes place in the pre-evaporator.

2. An apparatus for crystallizing solutions developing gases when subjected to a vacuum in continuous operation comprising a pre-evaporator connected to a crystallizer, means for continuously supplying a liquid to the pre-evaporator, means for evacuating both said pre-evaporator and said crystallizer to different degrees so that the absolute pressure within the crystallizer is less than that within the pre-evaporator, said crystallizer having an outlet connected to a classifier for separating the crystal slurry into fine and coarse fractions, an outlet for the coarse fraction connected to the pre-evaporator, both the pre-evaporator and the crystallizer being provided with a connection to a condenser, a central vertical tube in the crystallizer having at its lower end an inlet opening and at its upper end an outlet opening, and an impeller rotatably mounted in said tube.

References Cited by the Examiner

UNITED STATES PATENTS

| | | | |
|---|---|---|---|
| 1,230,162 | 6/17 | Hobsbawm et al. | |
| 1,906,534 | 5/33 | Burke | 23—273 X |
| 1,996,053 | 4/35 | Black et al. | 23—63 |
| 2,066,577 | 1/37 | Ritchie, et al. | 23—273 |
| 2,130,065 | 9/38 | Burke, et al. | 23—273 X |
| 2,347,073 | 4/44 | Beekhuis | 23—301 |
| 2,516,832 | 7/50 | Rosenbloom | 23—273 X |
| 2,567,968 | 9/51 | Saeman | 23—273 XR |
| 2,623,814 | 12/52 | Gray | 23—273 X |
| 2,631,926 | 3/53 | Eckstrom | 23—273 |
| 2,640,761 | 6/53 | Wiseman | 23—273 X |
| 2,707,669 | 5/55 | Houston et al. | 23—273 X |
| 2,867,523 | 1/59 | Lutz et al. | 71—64 X |
| 3,010,805 | 11/61 | Cheng | 23—273 |

NORMAN YUDKOFF, Primary Examiner.

ANTHONY SCIAMANNA Examiner.